(12) United States Patent
Degen

(10) Patent No.: US 8,458,859 B2
(45) Date of Patent: Jun. 11, 2013

(54) STRAP TENSIONER AND ASSOCIATED GRIPPING JAWS

(75) Inventor: Klemens Degen, Weibern (DE)

(73) Assignee: Wolfcraft GmbH, Kempenich (DE)

( * ) Notice: Subject to any disclaimer, the term of this patent is extended or adjusted under 35 U.S.C. 154(b) by 1384 days.

(21) Appl. No.: 10/576,637

(22) PCT Filed: Oct. 8, 2004

(86) PCT No.: PCT/EP2004/052478
§ 371 (c)(1),
(2), (4) Date: Jun. 15, 2010

(87) PCT Pub. No.: WO2005/039923
PCT Pub. Date: May 6, 2005

(65) Prior Publication Data
US 2011/0088226 A1   Apr. 21, 2011

(30) Foreign Application Priority Data

Oct. 23, 2003   (DE) .................................. 103 49 229

(51) Int. Cl.
*B25B 25/00* (2006.01)
(52) U.S. Cl.
USPC .................. 24/68 CD; 254/218; 269/108
(58) Field of Classification Search
USPC .................. 24/68 CD; 254/218; 269/108
See application file for complete search history.

(56) References Cited

U.S. PATENT DOCUMENTS

| | | | | |
|---|---|---|---|---|
| 1,395,553 A * | 11/1921 | Brophy | ........................ | 269/108 |
| 3,762,696 A * | 10/1973 | Falk et al. | ..................... | 269/108 |
| 4,542,883 A * | 9/1985 | Rutzki | ......................... | 254/217 |
| 4,622,721 A * | 11/1986 | Smetz et al. | ............... | 24/68 CD |
| 4,842,458 A * | 6/1989 | Carpenter | ......................... | 410/3 |
| 5,103,536 A * | 4/1992 | Kamper | ..................... | 24/68 CD |
| 5,271,606 A * | 12/1993 | Kamper | ........................ | 254/217 |
| 5,282,706 A * | 2/1994 | Anthony et al. | ............... | 410/100 |
| 5,313,721 A * | 5/1994 | Filden | .............................. | 40/1.6 |
| 5,542,798 A * | 8/1996 | Rawdon et al. | ............... | 410/100 |
| 6,007,053 A * | 12/1999 | Huang | .......................... | 254/247 |
| 6,102,371 A * | 8/2000 | Wyers | .......................... | 254/218 |
| 6,609,275 B1 * | 8/2003 | Lin | .............................. | 24/68 CD |
| 7,293,760 B1 * | 11/2007 | Chang | .......................... | 254/218 |
| 2003/0059269 A1 * | 3/2003 | Bosley | .......................... | 410/100 |
| 2003/0145434 A1 * | 8/2003 | Lin | ............................. | 24/68 CD |

* cited by examiner

*Primary Examiner* — Robert J Sandy
*Assistant Examiner* — David Upchurch
(74) *Attorney, Agent, or Firm* — K&L Gates LLP

(57) ABSTRACT

A strip clamping device having a strip to be clamped (1), a clamping mechanism (3) provided with a winding body (2) for the strip to be clamped (1), a toothed locking wheel (4) which is associated with the winding body (2) and has a locking toothed wheel work (5) in which a pawl (8) and a driving ratchet (7) associated with a driving lever (6) engage in order to rotate the winding body (2) in a defined direction by repeated pivoting of the driving lever (6). The winding body (2) has a spring accumulator (9) acting in the winding direction, and is a storage spool receiving essentially the entire length of the strip (1), one end of the strip being connected to the winding body (2) in a fixed manner.

8 Claims, 10 Drawing Sheets

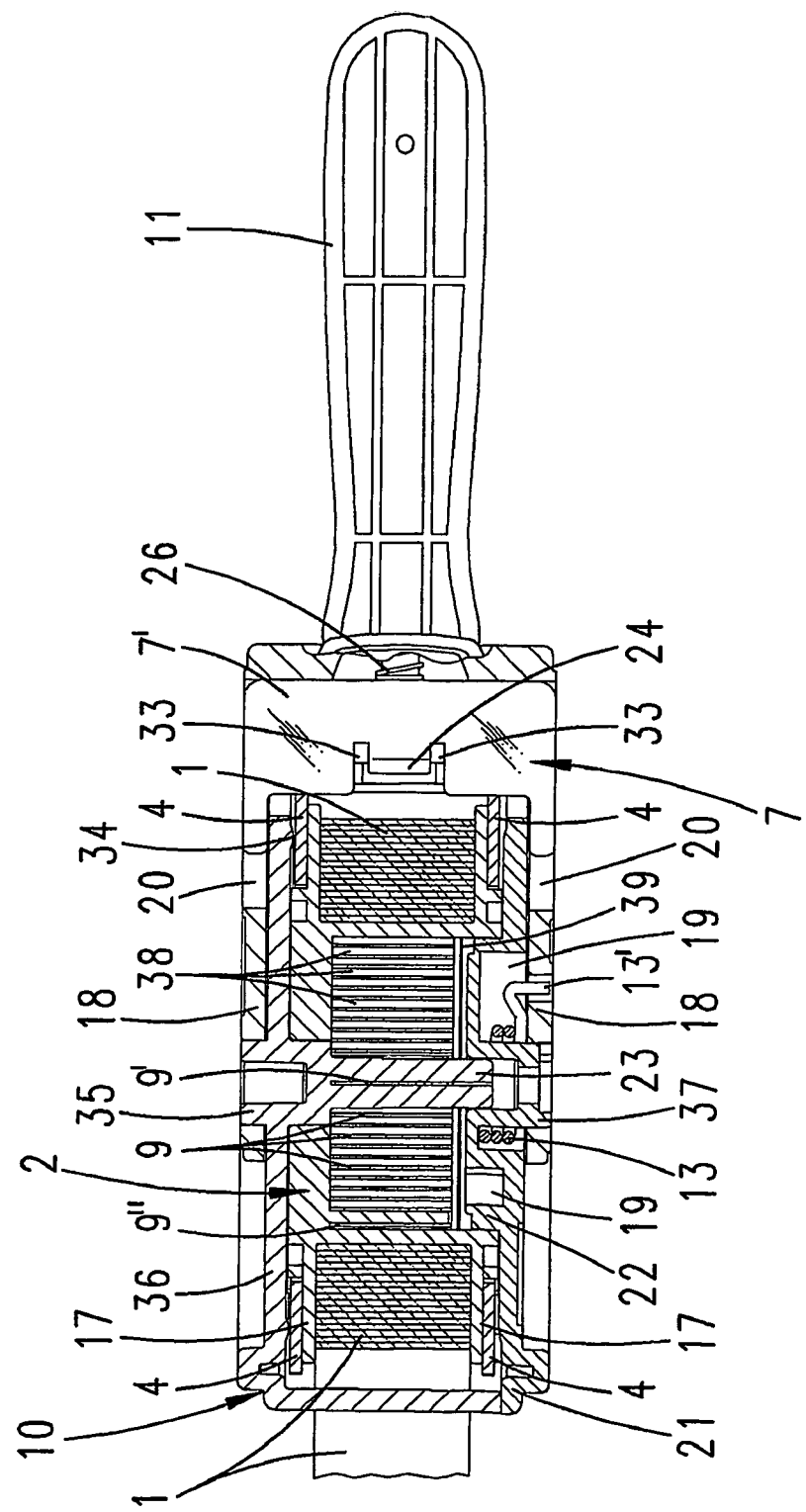

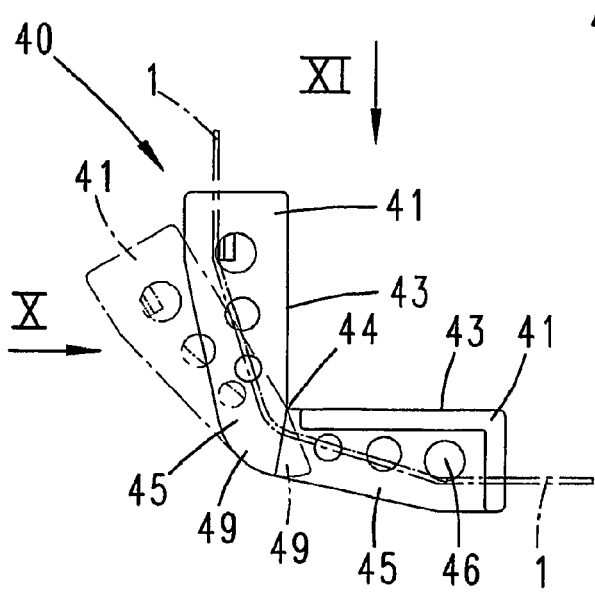
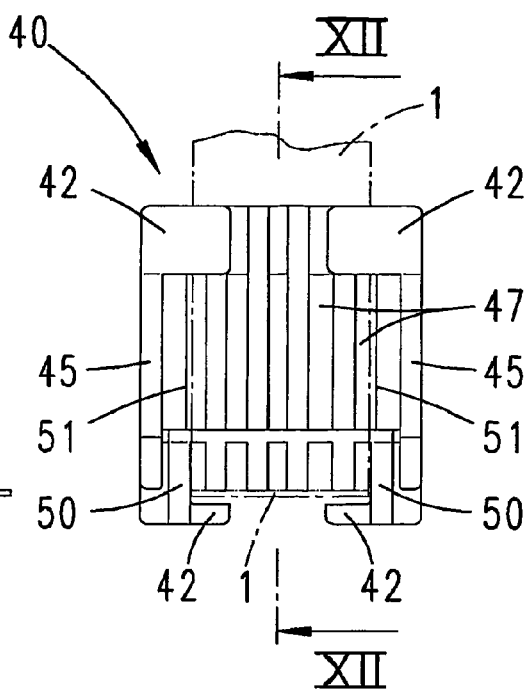
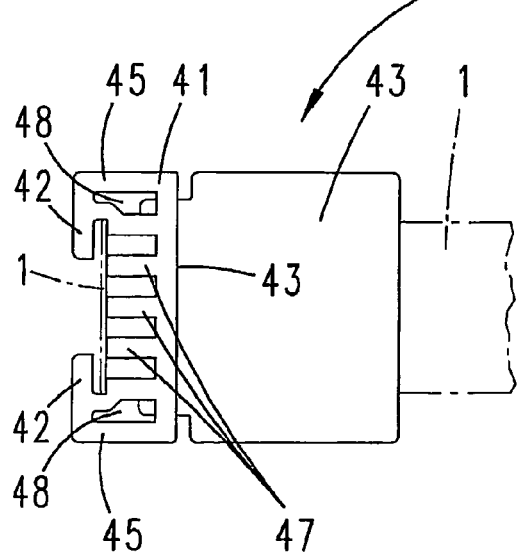
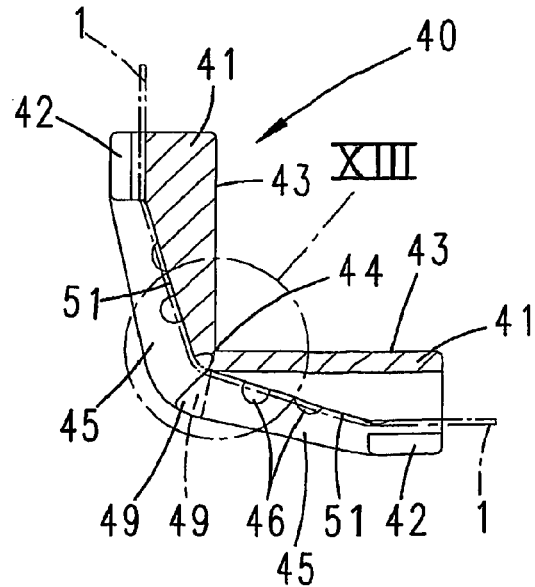

STRAP TENSIONER AND ASSOCIATED GRIPPING JAWS

CROSS REFERENCE TO RELATED APPLICATION

This application claims priority of German Patent Application Number 10349229.1, filed Oct. 23, 2003, and International Application Number PCT/EP2004/052478, filed Oct. 8, 2004, which are incorporated by reference.

BACKGROUND OF THE INVENTION

The invention relates to a strap tensioner having a tensioning strap and a tensioning device with a winding body for the tensioning strap, having a toothed locking wheel which is associated with the winding body and in the locking toothing arrangement of which a driving pawl, associated with a driving lever, and a locking pawl engage, in order, by way of repeated pivoting of the driving lever, to rotate the winding body with directional locking.

A strap tensioner is known from DE 202 04 955 U1. The winding body is in the form of a slotted shaft. The tensioning strap is pulled through the diametral slot of this shaft. When the winding body is rotated, the strap winds up around the winding body, the free end of the strap remaining loose.

EP 0 730 932 B1 discloses a strap tensioner in which the strap can be tensioned by means of a double pulley. The tensioning device has a storage pulley on which the strap which is not required can be wound up. A crank is provided for this purpose.

SUMMARY OF THE INVENTION

In view of the prior art mentioned above, an advantage of the invention can be to develop the strap tensioner of in a functionally advantageous manner.

In an embodiment, the winding body has a spring accumulator acting in the winding-up direction and, as a storage reel, accommodates substantially the entire length of the strap, which has one end connected fixedly to the winding body. To supplement this, the driving lever and a handle, which is connected fixedly to a tensioning-device housing, are associated with one another in a tong-like manner. Furthermore, the apparatus may have a release lever which is associated, in particular, with the handle and is intended for releasing the locking pawl. It is possible for the driving lever, for the purpose of applying the tensioning force, to be displaced in the direction of the handle counter to the force of a restoring spring. In the rest position, it is possible for the driving pawl not to be in engagement with the locking teeth. The locking wheel is then locked just by the locking pawl. If the locking pawl is released, then the force of the spring accumulator is capable of winding up the strap automatically when the driving lever is located in the rest position. The locking pawl located in the locking position prevents this winding-up action. The winding body may consist of plastics material. It may be disposed in a housing which is closed all the way around, the housing having a through-passage slot for the tensioning strap and, if appropriate, an operating opening for the driving pawl. An end of the tensioning strap which is not connected fixedly to the winding body may be provided with a hook. This hook can be hooked onto the housing. The locking wheel may consist of metal, preferably steel. It is of annular configuration. It is positioned in a form-fitting manner in the end wall of the winding body. The winding body preferably has two locking wheels which are each positioned in a form-fitting manner in the two opposite end walls of the winding body. The driving lever may have fork-like arms. By means of the latter, the driving lever can be articulated on the outside of the housing. The articulation axis preferably corresponds to the axis of rotation of the winding body.

The winding body is capable of accommodating the entire length of the tensioning strap. Winding up takes place automatically when the driving pawl and the locking pawl are moved out of toothing engagement. By virtue of the tensioning strap being pulled, the latter can be pulled off from the winding body again. When the tensioning strap is pulled off from the winding body, the winding body is rotated. This rotation is accompanied by stressing of a spiral spring which is disposed in a cavity of the winding body. When the driving pawl, in the rest position of the driving lever, is not in toothing engagement, all that is required, in order to wind up and/or pull out the strap, is to actuate the release lever, by means of which the locking pawl is rendered inactive.

The invention also relates to a gripping jaw, a total of four of these being associated with the tensioning strap. Each gripping jaw has two angled legs. On the outside of the angled legs, the gripping jaw has devices for securing in a longitudinally displaceable manner on a tensioning strap. These devices may be formed by guiding cross-pieces which at least partially enclose the tensioning strap. With their insides, the angled legs form gripping jaws for butting against a workpiece in the angled region. According to the invention, it is provided that the two legs are associated with one another in a pivotable manner. As a result of this configuration, it is possible to fit the gripping jaws not just at right-angled corners of a workpiece, but also at obtuse-angled corners of a workpiece. The two angled legs are preferably connected integrally to one another to form a film hinge. This is advantageous, in particular, when the tensioning strap is to be used to tension a mitre joint. The tips of the two mitred legs which are to be glued to one another then butt against the hinge leg. This rules out any slippage. Each of the two angled legs preferably has peripheral stiffening ribs. The tensioning strap is located between these two stiffening ribs. Wedged ribs may also be disposed between the two stiffening ribs, the wedge tips being oriented toward the film hinge. The film-hinge ends of the stiffening ribs are lengthened such that they overlap in the 90° position. The overlapping regions may have stop edges which, in the opened-out position, act on counter stops of the respectively other angled leg.

Additional features and advantages of the present invention are described in, and will be apparent from, the following Detailed Description of the Invention and the figures.

BRIEF DESCRIPTION OF THE FIGURES

An exemplary embodiment of the invention is explained hereinbelow with reference to attached drawings, in which:

FIG. 8 shows a section along line VIII-VIII in FIG. 1, FIG. 9 shows a gripping jaw in side view in its 90° position and, using chain-dotted lines, in an obtuse-angled pivoted position, FIG. 10 shows a view in the direction of the arrow X in FIG. 9, FIG. 11 shows a view in the direction of arrow XI in FIG. 9, FIG. 12 shows a section along line XII-XII in FIG. 10.

DETAILED DESCRIPTION OF THE INVENTION

Figure 1:
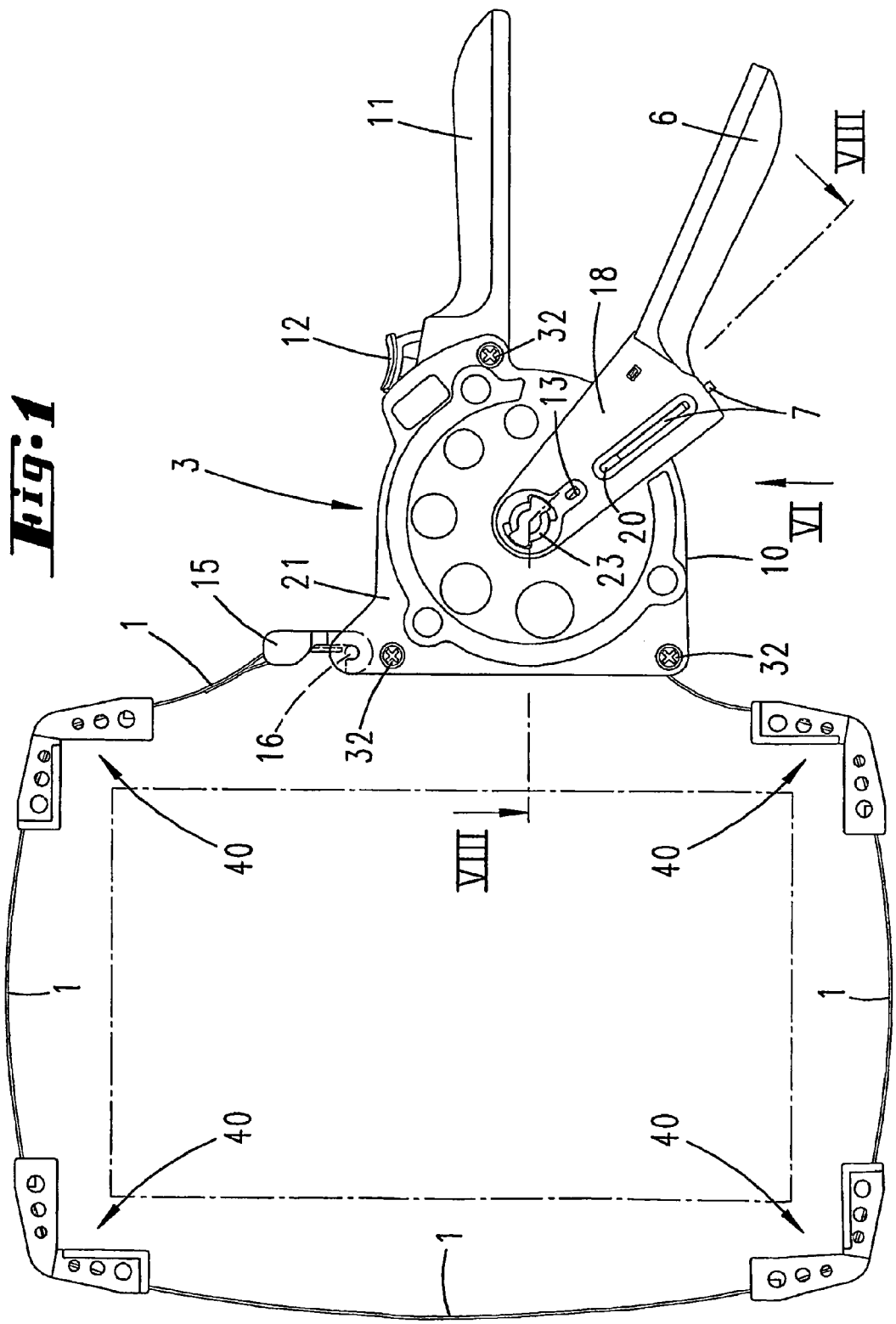
FIG. 1 shows the strap tensioner according to the invention in plan view, with four associated gripping jaws.

The basic construction of the strap tensioner is shown in FIG. 1. The strap tensioner has a tensioning device 3, which has a housing 10 in which a winding body 2 is disposed. A handle 11 is connected fixedly to the housing 10. A release lever 12 is provided in the region of connection to the housing. The driving lever 6 has, in a fork-like manner, two arms 18, by means of which it is secured in a pivotable manner on the housing 10.

The tensioning strap 1 can be wound up on the winding body 2. Four gripping jaws 40 are seated on the tensioning strap. The free end of the tensioning strap 1 has a hook 15 which can be hooked around a pin 16, which is fixed to the housing 10.

Figure 2:
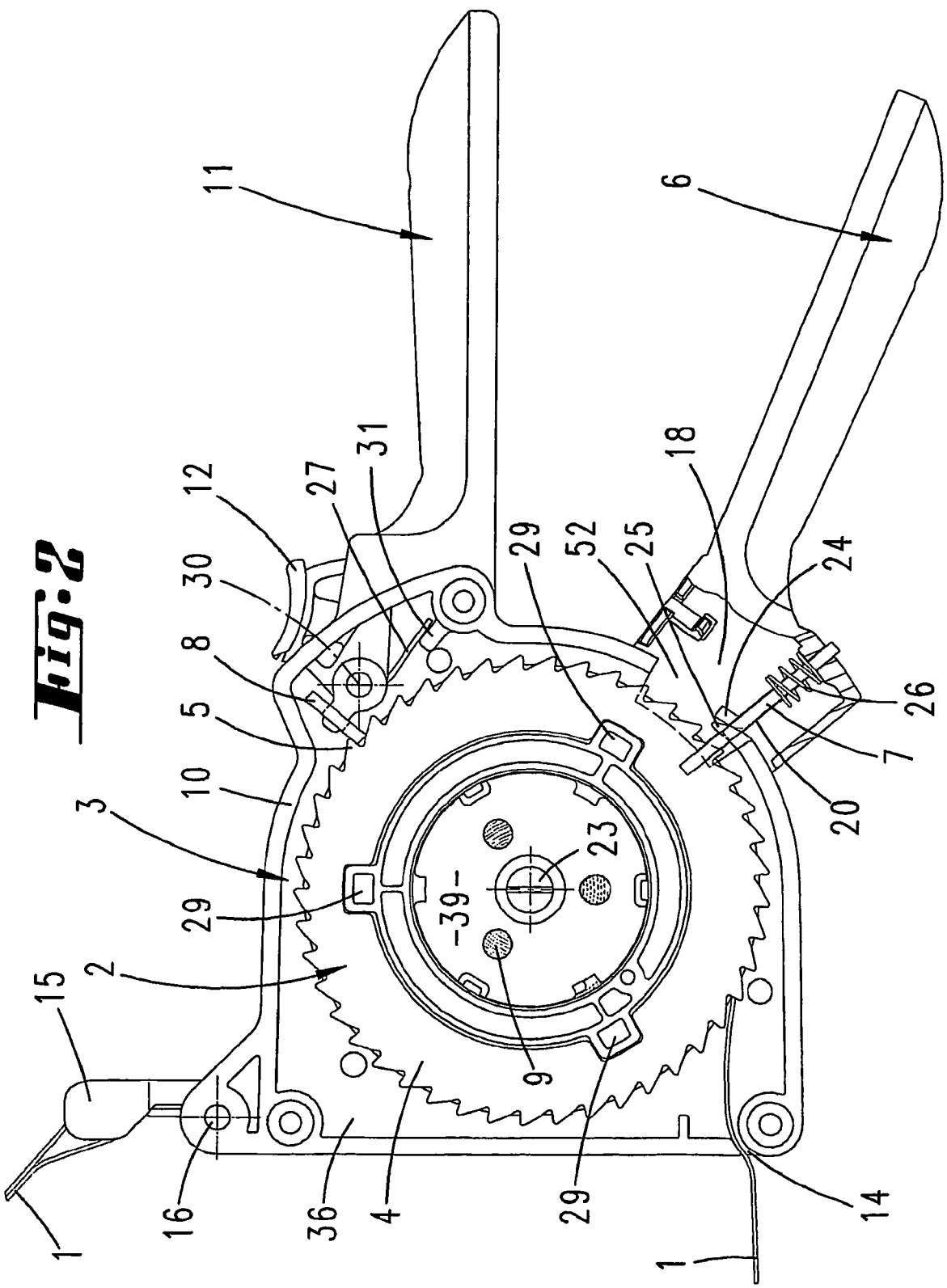
FIG. 2 shows an enlarged illustration of the strap tensioner according to FIG. 1 in plan view, with the housing cover removed, in the non-actuated position, in which the driving pawl 7 is not in toothing engagement, but the locking pawl is in toothing engagement.

The elements of the strap tensioner can be gathered, in particular, from FIGS. 2 and 8. The winding body 2 consists of plastics material. It has an inner cavity 38 and can be rotated about a journal, which is connected fixedly to the base 36 of the housing 10. The journal 23 has a diametral slot. One end 9' of a spring accumulator 9, which is illustrated as a flat spiral spring, is secured in this diametral slot. The other end 9" of the spring accumulator 9 is secured on the wall of the cavity 38 of the winding body 2. On the outside, the winding body 2 forms an annular storage space for the strap 1. The storage space is flanked by the two end walls 17 of the winding body 2.

If the tensioning strap 1 has been wound up fully onto the winding body, the spring accumulator 9, which is located beneath a covering 39, is prestressed to a slight extent. If the tensioning strap 1 is pulled off from the winding body 2, then this is associated with rotation of the winding body 2. This rotation is accompanied by stressing of the spring accumulator 9. The winding body 2 rotates about the journal 23 in this case.

On their sides which are oriented away from one another, the two end walls 17 form recesses for accommodating a respective locking wheel 4. Each locking wheel 4 consists of a punched steel part and has a locking toothing arrangement 5 on the outside. On the inside, each locking wheel 4 has a recess 28, in which protrusions 29 of the end side 17 engage in a form fitting manner in order to ensure rotationally fixed connection of the locking wheel 4 to the winding body 2. The locking wheels 4 may well be positioned loosely in the recesses associated with them. The base 36 of the housing 10 forms an annular spacer bead 34, on which the locking wheel 4 slides.

The other locking wheel 4 is borne by the housing cover 21. The housing cover 21 is secured on the housing 10 by means of fastening screws 32. In the center, the housing cover 21 forms an opening into which the free end of the journal 23 projects. The bearing base 22, which encloses the journal 23, projects into the cavity 38 of the winding body 2 and thus likewise serves for the rotational mounting of the winding body 2.

The cover 21, furthermore, has a central bearing portion 37 for one arm 18 of the fork-like driving lever 6. The other arm 18 of the fork-like driving lever 6 is mounted such that it can be pivoted about a bearing portion 35 of the housing base.

The housing base 36 forms, in the manner of a pin, a pivot axis 30 for the release lever 12. An actuating portion of the release lever 12 projects through an opening of the housing in order to be actuated from the outside. If the actuating portion of the release lever 12 is actuated, then a locking pawl 8 is pivoted. This takes place counter to the restoring force of a locking-pawl spring 27, which is supported on an abutment 31 of the housing. In the exemplary embodiment, the locking-pawl spring 27 is formed by a leg spring and the locking pawl 8 is formed by a metal component which, in the locking position, engages in the toothing arrangement 5 of the two locking wheels 4. The strength of the locking-pawl spring 27 is such that, when the locking pawl 8 is located in the toothing arrangement 5, the spring accumulator 9 is not capable of rotating the winding body 2. The locking pawl 8 thus does not just form a lock against the strap 1 being pulled out, but also inhibits rotation.

The driving lever 6 carries a driving pawl 7. The outer portions 7' of the driving pawl 7 are guided in slots 20 of the driving-lever arms 18. By means of its locking edge 7", the driving pawl 7 is capable of engaging in the toothing arrangement of the locking wheels 4. Pivoting of the driving lever 6 then results in the winding body 2 being rotated in the tensioning direction.

Figure 7:
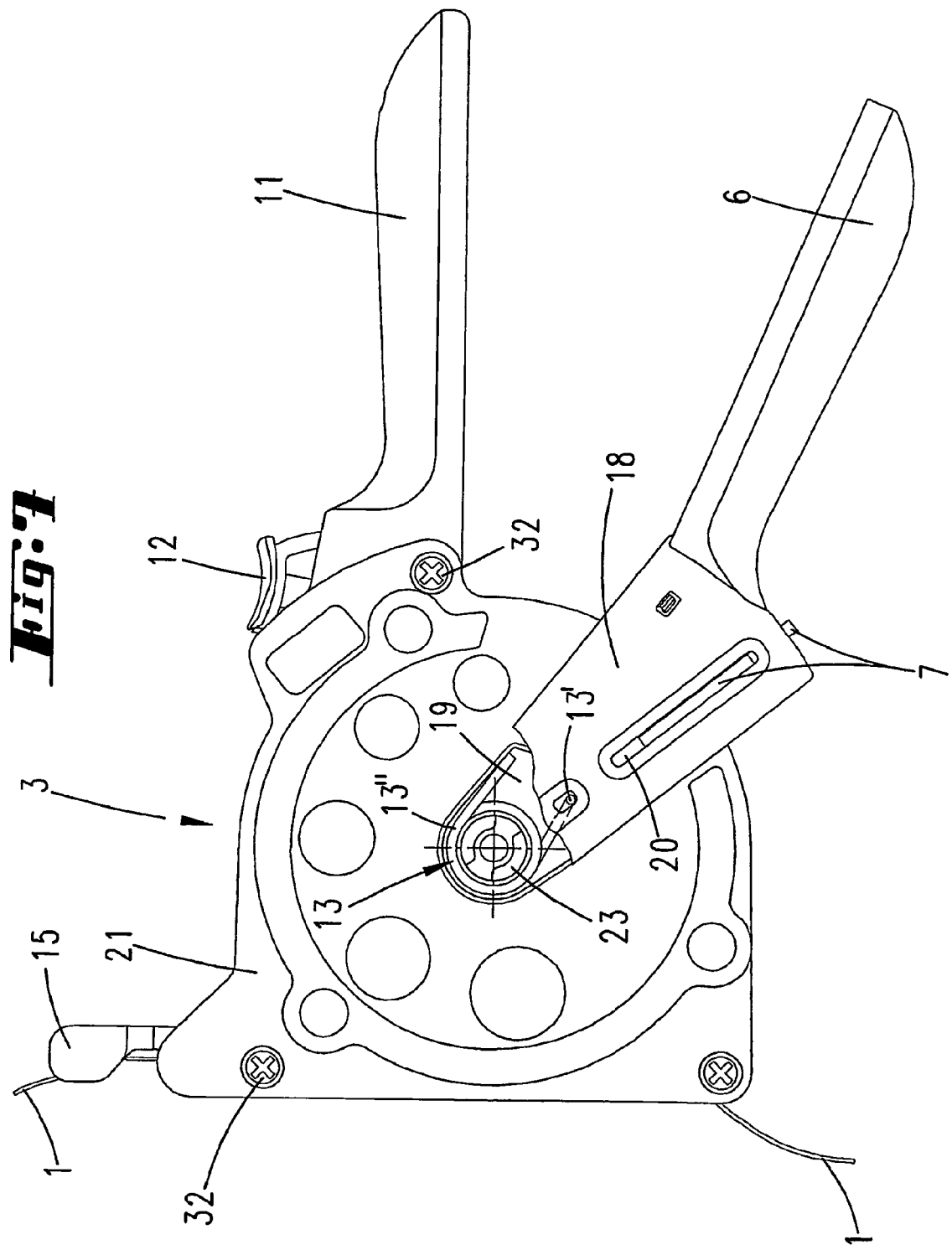
FIG. 7 shows an enlarged illustration according to FIG. 1 with one arm 18 of the driving lever 6 broken away in the region of its point of articulation.
Figure 13:
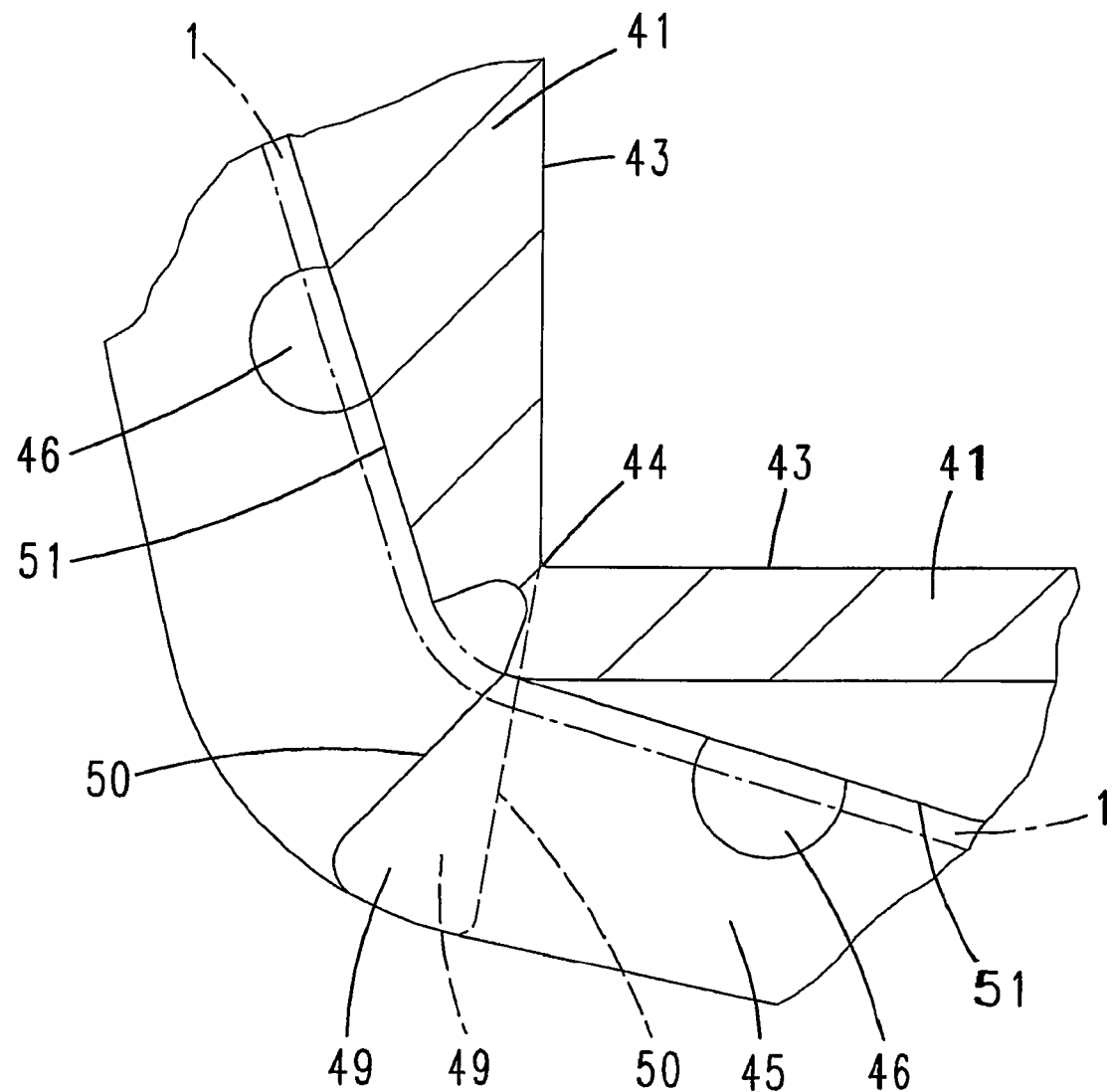
FIG. 13 shows an enlarged detail according to region XIII in FIG. 12.

As FIG. 7 shows, the driving lever 6 is retained by means of a restoring spring 13 in a rest position, in which it is spread apart from the handle 11. The restoring spring 13 is a leg spring, the end 13' of which engages in an opening of the driving-lever arm 18. The leg spring 13 as such is located in a recess 19 of the housing cover. The other end 13" of the restoring spring 13 is supported on the wall of this recess 19.

As can be gathered from FIG. 2, the periphery of an operating opening 52 has a drive protrusion 25. This drive protrusion 25 drives an angled portion 24, which forms a drive slope of the driving pawl 7 such that the locking edge 7" of the driving pawl 7, in the rest position (FIG. 2), does not engage in the toothing arrangement 5 of the locking wheel 4. FIG. 2 also shows the compression spring 26, which biases the driving pawl 7, under spring force, in the direction of the locking wheel 4. The through-passage slot 14 for the tensioning strap can also be seen in this figure.

The strap tensioner functions as follows:

In an operating position which is not illustrated, the entire tensioning strap 1 has been wound up on the winding body 2. It is also possible, however, for the starting position to be the position illustrated in FIG. 1, in which the tensioning strap is positioned loosely around a workpiece, which is illustrated by chain-dotted lines there, and the hook 15 is hooked into the pin 16. The gripping jaws, which are designated by the reference numeral 40, are associated with the corners of the workpiece.

Figure 3:
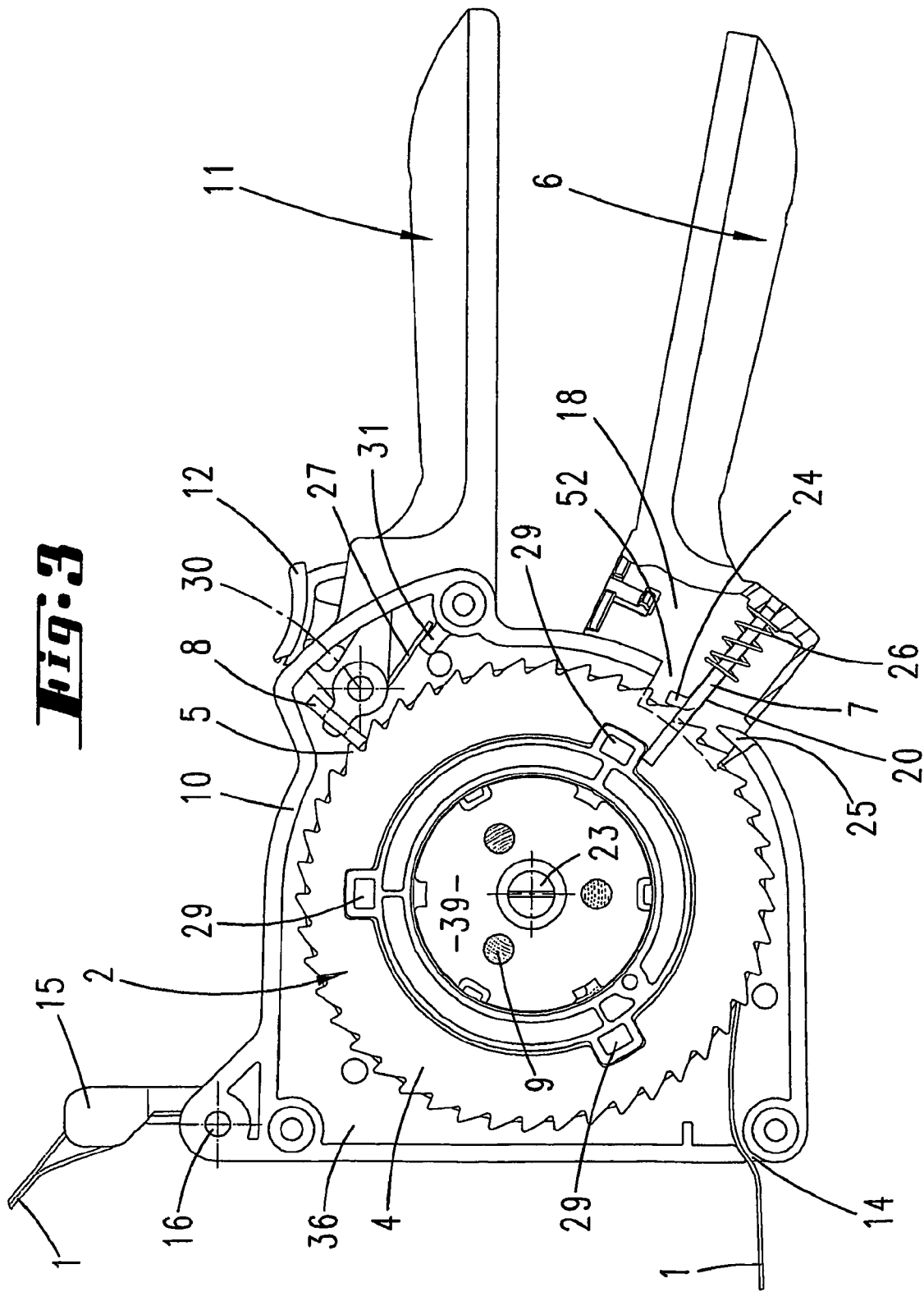
FIG. 3 shows an illustration according to FIG. 2 with the driving lever displaced slightly, with the result that the driving pawl comes into toothing engagement.
Figure 4:
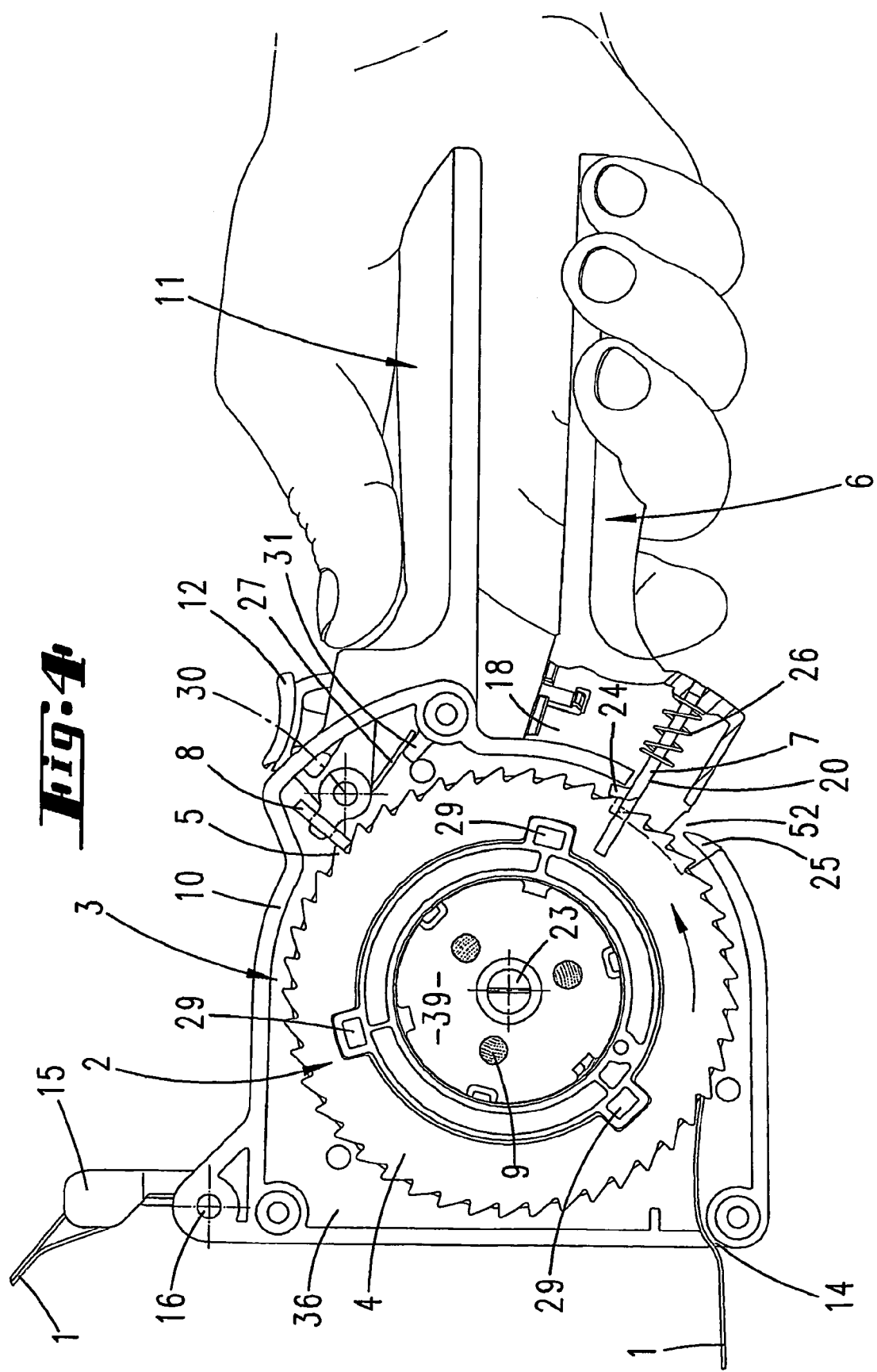
FIG. 4 shows a follow-up illustration to FIG. 3 with the driving lever 6 displaced toward the handle 11.

Starting from this functional position, in which the locking-pawl mechanism assumes the position which is illustrated in FIG. 2, the driving lever 6 is displaced in the direction of the handle 11. In this case, the drive slope of the driving pawl, this slope being formed by the angled portion 24, slides off from the drive protrusion 25. The compression spring 26 displaces the driving pawl 7 in the direction of the toothing arrangement such that the edge 7" engages in the toothing arrangement 5. Starting from this functional position, which is illustrated in FIG. 3, the driving lever 6 is then displaced further in the direction of the handle 11, as is illustrated in FIG. 4. This is accompanied by the winding body 2 being carried along in rotation in the arrow direction. The tensioning strap 1 is wound up on the winding body 2, the strap tensioning being increased simultaneously. If, once the driving lever 6 has been pulled right up to the handle 11, the driving lever 6 is released, then the force of the restoring spring 13 ensures that the driving lever 6 is displaced back into the starting position illustrated in FIG. 2. The locking pawl 8 secures the locking wheel. The edge 7" of the driving pawl 7 slides over the sloping surfaces of the toothing arrangement 5.

By virtue of the previously described rotary actuation of the pawl-locked winding body 2 being repeated a number of times, the strap is tensioned in a known manner.

Figure 5:
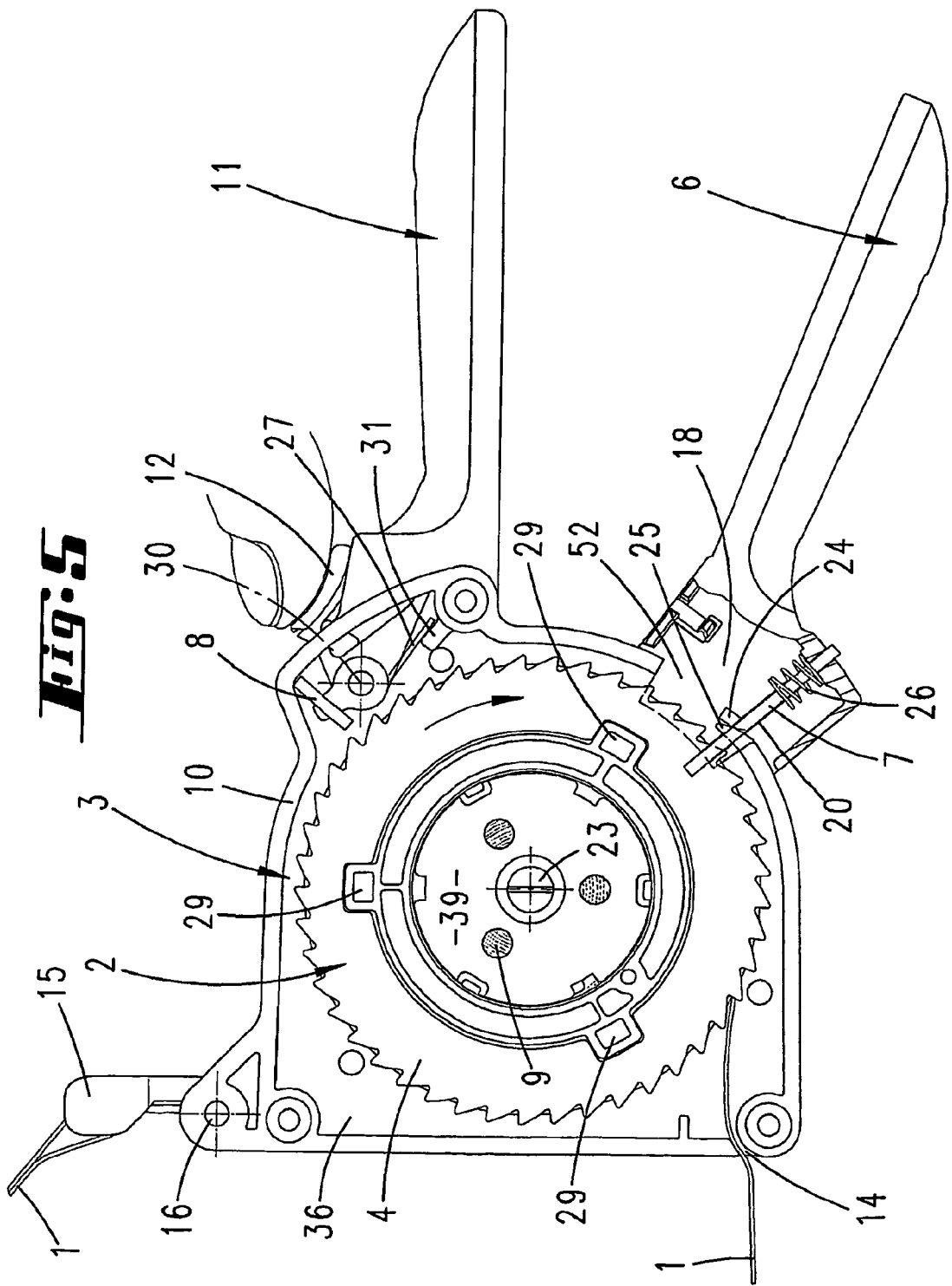
FIG. 5 shows a follow-up illustration to FIG. 2 with release levers 12 actuated.
Figure 6:
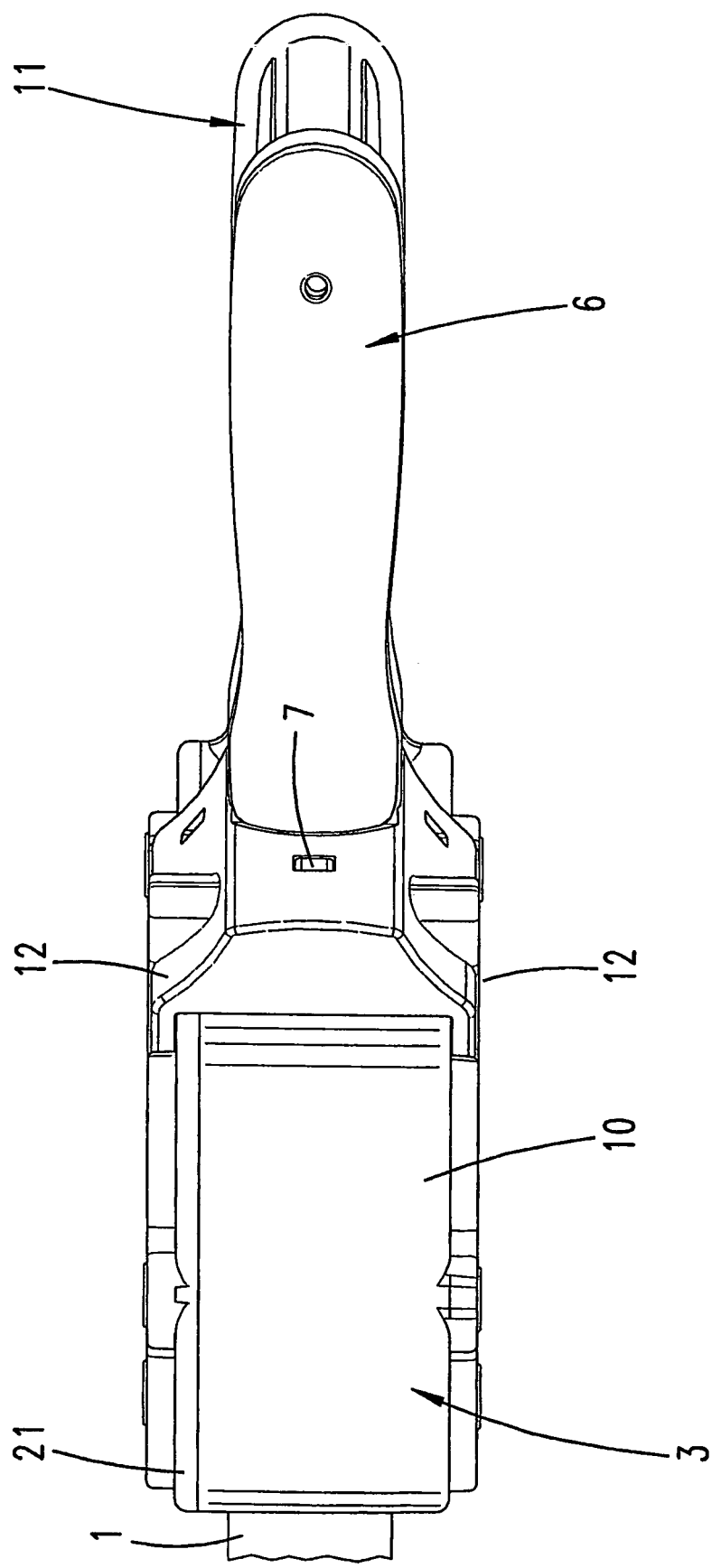
FIG. 6 shows a side view as seen from the direction of arrow VI in FIG. 1.

The tensioning is released by virtue of the release lever 12 being pressed. This takes place in the position illustrated in FIG. 5, in which the drive protrusion 25 has driven the driving pawl 7 out of toothing engagement, and it is thus possible, by virtue of the tensioning strap 1 being pulled, for the winding body to be rotated in the arrow direction illustrated in FIG. 5. This rotation is accompanied by the spring accumulator 9 being stressed. If, in the operating position illustrated in FIG. 5, the tensioning strap is not subjected to pulling, then the spring accumulator 9 is capable of rotating the winding body 2 counter to the arrow direction illustrated in FIG. 5, which results in the tensioning strap 1 being wound up automatically on the winding body.

In the tensioning position, it is possible for a planar outer housing surface 10' to be positioned against the workpiece.

FIGS. 9 to 13 show a gripping jaw 40 in detail. This gripping jaw comprises a plastics injection molding. The gripping jaw has two angled legs 41 which are connected to one another to form a film hinge 44. The two angled legs 41 form, on the inside, gripping surfaces 43 which can be moved in relation to one another from a 90° position into an opened-out position.

Peripheral stiffening ribs 45 are located to the rear of the gripping surfaces 43. The tensioning strap 1 is guided between the two stiffening ribs 45 of each angled leg 41. Guiding cross-pieces 42 project toward one another from each stiffening rib 45 and engage over the peripheral portion of the strap 1 in order to secure the latter in a longitudinally displaceable manner on the gripping jaw 40.

A multiplicity of wedged ribs 47 are also located between the two stiffening ribs 45. These wedged ribs extend, at their tips, from the film hinge 44. The tensioning strap 1 is guided on the wedged ribs 47.

The film-hinge ends of the stiffening ribs 45 form overlapping portions 49. The overlapping portions 49 form stop edges 50. In an operating position which is not illustrated, the stop edges 50 can be brought into abutment against counter stops 51 of the respectively other angled leg 41. In addition, the stiffening ribs 45 also have openings 46 which are circular in plan view and have different diameters.

As can be gathered from FIG. 1, the stiffening ribs 45 have cavities 48.

All features disclosed are (in themselves) pertinent to the invention. The disclosure content of the associated/attached priority documents (copy of the prior application) is hereby also included in full in the disclosure of the application, also for the purpose of incorporating features of these documents in claims of the present application.

It should be understood that various changes and modifications to the presently preferred embodiments described herein will be apparent to those skilled in the art. Such changes and modifications can be made without departing from the spirit and scope of the present invention. It is therefore intended that such changes and modifications be covered by the appended claims.

The invention claimed is:

1. A strap tensioner, comprising:
a tensioning strap; and
a tensioning device having a winding body for the tensioning strap, a toothed locking wheel associated with the winding body and having a locking toothing arrangement, a driving pawl associated with a driving lever, a locking pawl, wherein engagement of the driving pawl and the locking pawl with the locking toothing arrangement and repeated movement of the driving lever rotates the winding body with directional locking, and the winding body having a spring accumulator acting in a winding-up direction and accommodating substantially an entire length of the tensioning strap which has an end connected fixedly to the winding body;
wherein the driving lever and a handle, which is connected fixedly to a tensioning-device housing, are associated with one another in a tong-like manner, and wherein the driving lever is displaceable towards the handle counter to a force of a restoring spring thereby applying a tensioning force to the tensioning strap in the winding-up direction.

2. The strap tensioner according to claim 1, further comprising a release lever associated with the handle and which releases the locking pawl.

3. The strap tensioner according to claim 1, wherein the driving lever in a rest position is not in engagement with the locking toothing arrangement.

4. The strap tensioner according to claim 3, wherein the spring accumulator is capable of winding up the strap automatically when the driving lever is located in the rest position and the release lever is brought into a release position.

5. The strap tensioner according to claim 1, wherein the winding body consists of plastics material and is disposed in the housing which is substantially entirely closed and has a through-passage slot for the tensioning strap and operating openings for the driving pawl and a release lever associated with the locking pawl.

6. The strap tensioner according to claim 1, wherein a free end of the tensioning strap has a hook for hooking onto the tensioning-device housing.

7. The strap tensioner according to claim 1, wherein the toothed locking wheel is formed by an annular punched metal part which is positioned in a form-fitting manner in an end wall of the winding body.

8. The strap tensioner according to claim 1, wherein the driving lever has fork-like arms which are articulated on an outside of the housing.

* * * * *